(12) United States Patent
Scipio et al.

(10) Patent No.: US 10,975,774 B2
(45) Date of Patent: Apr. 13, 2021

(54) SYSTEMS AND METHODS FOR COMPRESSOR ANTICORROSION TREATMENT

(71) Applicant: GENERAL ELECTRIC COMPANY, Schenectady, NY (US)

(72) Inventors: Alston Ilford Scipio, Atlanta, GA (US); Paul Robert Fernandez, Atlanta, GA (US); Rebecca Evelyn Hefner, Greenville, SC (US); Sanji Ekanayake, Atlanta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 690 days.

(21) Appl. No.: 14/571,322

(22) Filed: Dec. 16, 2014

(65) Prior Publication Data

US 2016/0169116 A1 Jun. 16, 2016

(51) Int. Cl.
  *F02C 7/30* (2006.01)
  *F01D 25/00* (2006.01)
  *F02C 7/143* (2006.01)

(52) U.S. Cl.
  CPC .............. *F02C 7/30* (2013.01); *F01D 25/002* (2013.01); *F01D 25/007* (2013.01); *F02C 7/1435* (2013.01)

(58) Field of Classification Search
  CPC .. F02C 7/30; F02C 7/1435; F02C 3/30; F01D 25/002; F01D 25/007
  See application file for complete search history.

(56) References Cited

U.S. PATENT DOCUMENTS

| | | | |
|---|---|---|---|
| 6,491,048 B1* | 12/2002 | Foster | F01D 25/002 134/166 R |
| 6,659,715 B2 | 12/2003 | Kuesters et al. | |
| 8,475,110 B2 | 7/2013 | Hefner et al. | |
| 9,103,261 B1* | 8/2015 | White | G01N 24/08 |
| 2002/0141882 A1 | 10/2002 | Ingistov et al. | |
| 2004/0026261 A1 | 2/2004 | Stoffer et al. | |
| 2006/0060218 A1* | 3/2006 | Lakdawala | F01D 25/002 134/22.1 |
| 2007/0059159 A1* | 3/2007 | Hjerpe | B08B 3/02 415/117 |
| 2009/0158739 A1 | 6/2009 | Messmer | |
| 2010/0303670 A1* | 12/2010 | Odle | B01J 19/002 422/9 |
| 2011/0027063 A1 | 2/2011 | Hefner et al. | |
| 2012/0251742 A1 | 10/2012 | Kerber | |

(Continued)

FOREIGN PATENT DOCUMENTS

EP 0 674 024 A2 9/1995

OTHER PUBLICATIONS

U.S. Appl. No. 13/492,333, filed Jun. 8, 2012, Scipio, et al., Application not yet published.

(Continued)

*Primary Examiner* — Katheryn A Malatek
(74) *Attorney, Agent, or Firm* — Eversheds Sutherland (US) LLP

(57) ABSTRACT

The present application provides a gas turbine engine. The gas turbine engine may include a compressor, a compressor wash system in communication with the compressor, a condensate or boiler feed water system in communication with the compressor, and a dosing system in communication with the condensate or boiler feed water system.

18 Claims, 4 Drawing Sheets

(56) References Cited

U.S. PATENT DOCUMENTS

| | | | |
|---|---|---|---|
| 2013/0186435 A1* | 7/2013 | Saha | F01D 25/002 134/36 |
| 2013/0192193 A1* | 8/2013 | Yoshida | F01K 23/10 60/39.182 |
| 2013/0330172 A1* | 12/2013 | Scipio | F01D 25/002 415/116 |
| 2014/0124007 A1 | 5/2014 | Scipio et al. | |
| 2014/0126998 A1 | 5/2014 | Scipio et al. | |
| 2014/0174163 A1 | 6/2014 | Ekanayake et al. | |
| 2014/0174474 A1 | 6/2014 | Ekanayake et al. | |

OTHER PUBLICATIONS

U.S. Appl. No. 14/297,007, filed Jun. 5, 2014, Ekanayake, et al, Application not yet published.
U.S. Appl. No. 14/297,060, filed Jun. 5, 2014, Ekanayake, et al., Application no yet published.
U.S. Appl. No. 14/297,015, filed Jun. 5, 2014, Ekanayake, et al., application not yet published.

* cited by examiner

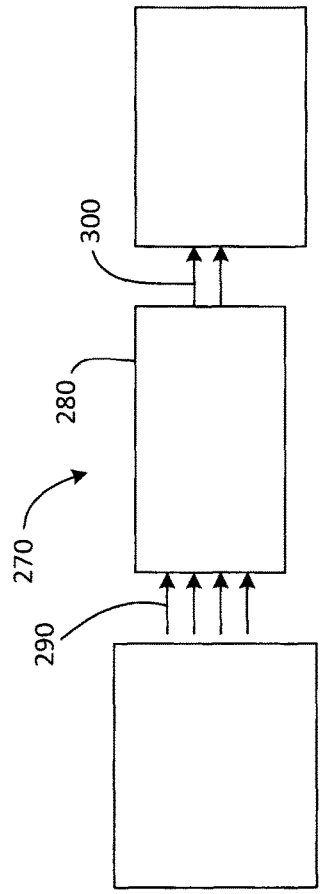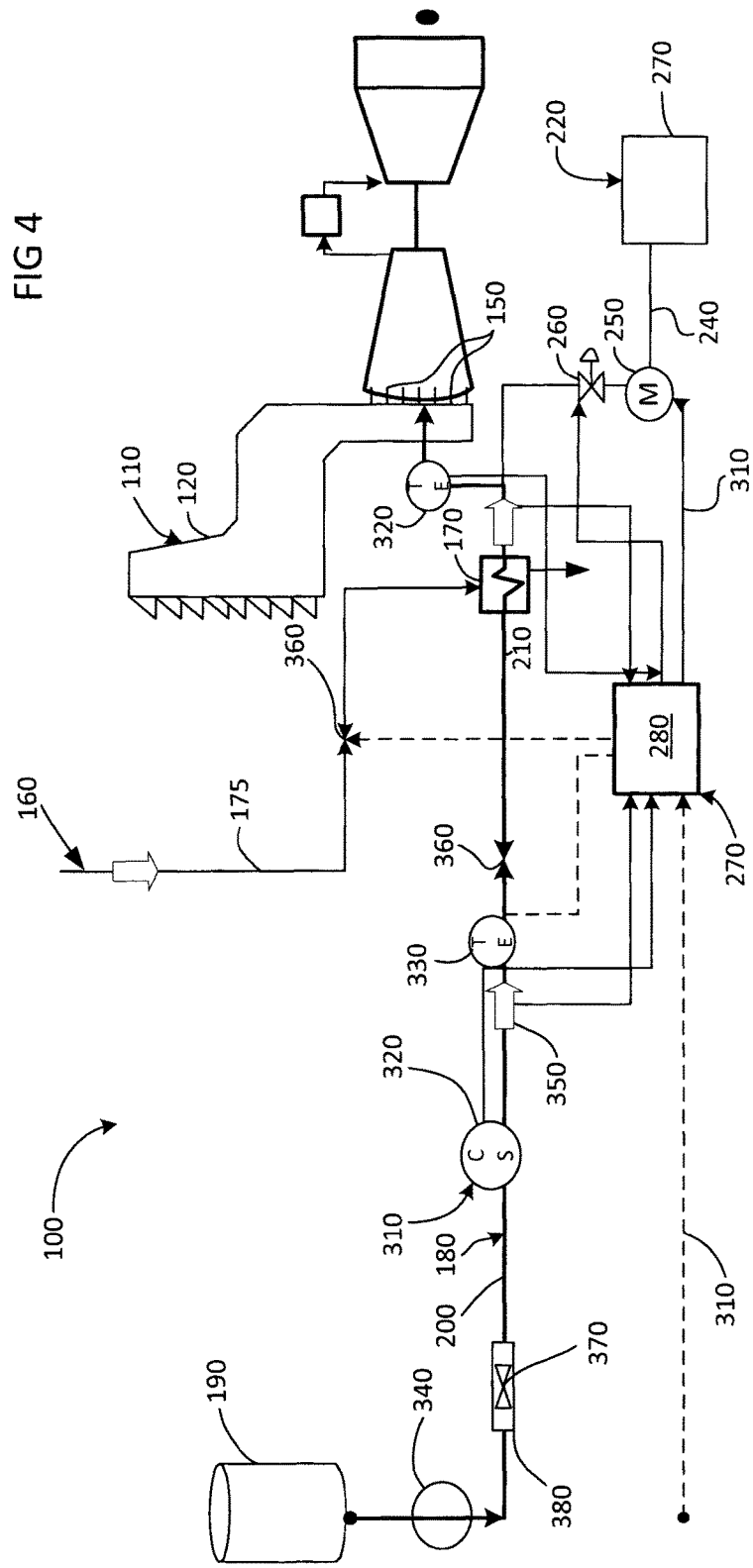

SYSTEMS AND METHODS FOR COMPRESSOR ANTICORROSION TREATMENT

TECHNICAL FIELD

The present application and the resultant patent relate generally to gas turbine engines and more particularly relate to online and offline compressor anticorrosion treatment systems using condensate or boiler feed water for component passivation.

BACKGROUND OF THE INVENTION

As a gas turbine engine operates, airborne contaminants may accumulate on the internal components of the engine, such as the blades and the vanes of the compressor. Although the gas turbine engine may include an inlet air filtration system, a certain degree of contaminant accumulation may be unavoidable depending upon the specific environmental conditions at the site of operation. Common contaminants may include small amounts of dust, debris, ice, and the like that may pass through the inlet air filtration system as well as un-filterable hydrocarbon-based materials such as smoke, soot, grease, oil film, organic vapors, and the like. Over time, the accumulation of contaminants on the compressor blades and vanes may restrict the airflow through the compressor and may shift the airfoil pattern. In this manner, such accumulation may adversely impact the performance and efficiency of the overall gas turbine engine with decreased power output, increased fuel consumption, and increased overall operating costs.

In order to reduce contaminant accumulation, the gas turbine engine may include a water wash system for removing contaminating particles from the compressor blades and vanes. For example, an online water wash system may be used to remove contaminant particles from the compressor blades and vanes via a flow of water, such as demineralized water, while the gas turbine engine is loaded and operating at full speed. The online water wash system may deliver the flow of water upstream of the compressor via an online manifold including nozzles positioned about a bellmouth of the compressor. The nozzles may create a spray mist of water droplets in this region of relatively low velocity air such that the negative pressure produced by the compressor may draw the spray mist therein and into contact with the compressor blades, vanes, and other components.

An offline water wash system also may be used in a similar manner to remove more effectively the contaminant particles via a flow of water and detergent while the gas turbine engine is shut down or not loaded and operating at a turning gear speed. The offline water wash system may deliver the flow of water and detergent upstream of the compressor via an offline manifold including nozzles positioned about the bellmouth of the compressor. In certain applications, the water wash system may be configured to operate in either an online mode or an offline mode. In this manner, online washes may be carried out periodically to increase performance and efficiency of the gas turbine engine when the operating schedule does not permit shutdown time so as to perform a more effective offline wash. The frequency and duration of the online and the offline washes may vary depending on the degree and type of contaminant accumulation and the local environmental conditions.

In addition to online and offline washes, proactive treatment of the compressor blades, vanes, and other components also may be employed. For example, passivation involves processes and techniques to treat a metal alloy to become less effected by the prevailing factors in the environment. Metal passivation generally involves a predetermined combination of water based anticorrosion chemicals to develop a micro-coating that forms a shielding outer layer so as to inhibit deeper corrosion of the metal.

There is therefore a desire for improved anticorrosion systems and methods of washing and passivating compressor blades and other turbine components. Preferably such improved systems and methods may avoid both complicated wash systems and extensive down time. Moreover, such improved systems and methods may be incorporated into existing designs.

SUMMARY OF THE INVENTION

The present application and the resultant patent thus provide a gas turbine engine. The gas turbine engine may include a compressor, a compressor wash system in communication with the compressor, a condensate or boiler feed water system in communication with the compressor, and a dosing system in communication with the condensate or boiler feed water system.

The present application and the resultant patent further provide a method of providing an anticorrosion treatment to a compressor. The method may include the steps of providing a flow of condensate or boiler feed water, determining one or more flow characteristics of the flow of condensate or boiler feed water, determining a concentration of an anticorrosion agent in the flow of condensate or boiler feed water, adjusting the one or more flow characteristics and/or the concentration to within one or more predetermined parameters, and flowing the condensate or boiler feed water into the compressor.

The present application and the resultant patent further provide an anticorrosion treatment system for use with a gas turbine engine. The anticorrosion treatment system may include a wash system for providing a flow of a wash fluid to the gas turbine engine, a condensate or boiler feed water system for providing a flow of condensate or boiler feed water to the gas turbine engine, and a temperature and concentration management system to control a concentration of an anticorrosion agent in the flow of the condensate or boiler feed water to the gas turbine engine for the anticorrosion treatment.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a schematic diagram of a gas turbine engine with a compressor anticorrosion treatment system as may be described herein.

FIG. 4 is a schematic diagram of a temperature and concentration management system that may be used with the compressor anticorrosion treatment system of FIG. 3.

DETAILED DESCRIPTION

Figure 1:
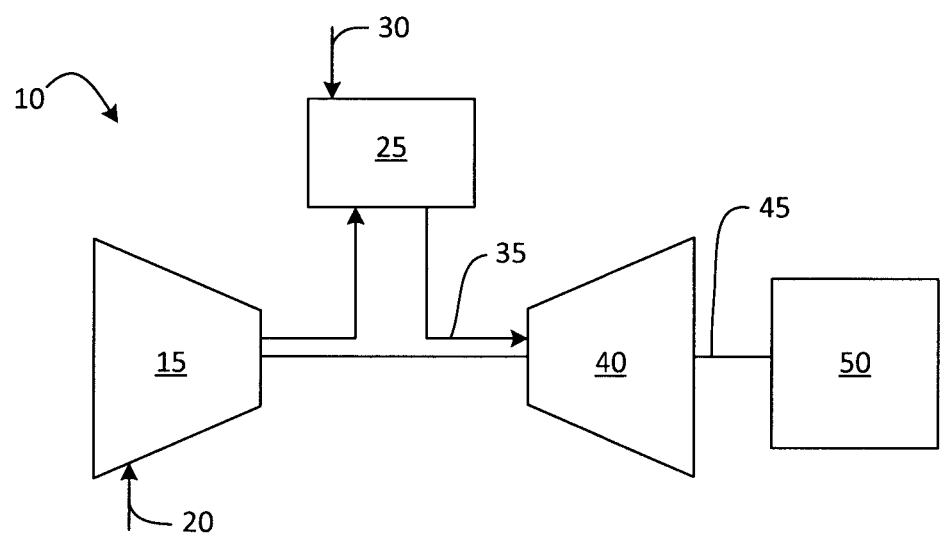
FIG. 1 is a schematic diagram of a gas turbine engine including a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
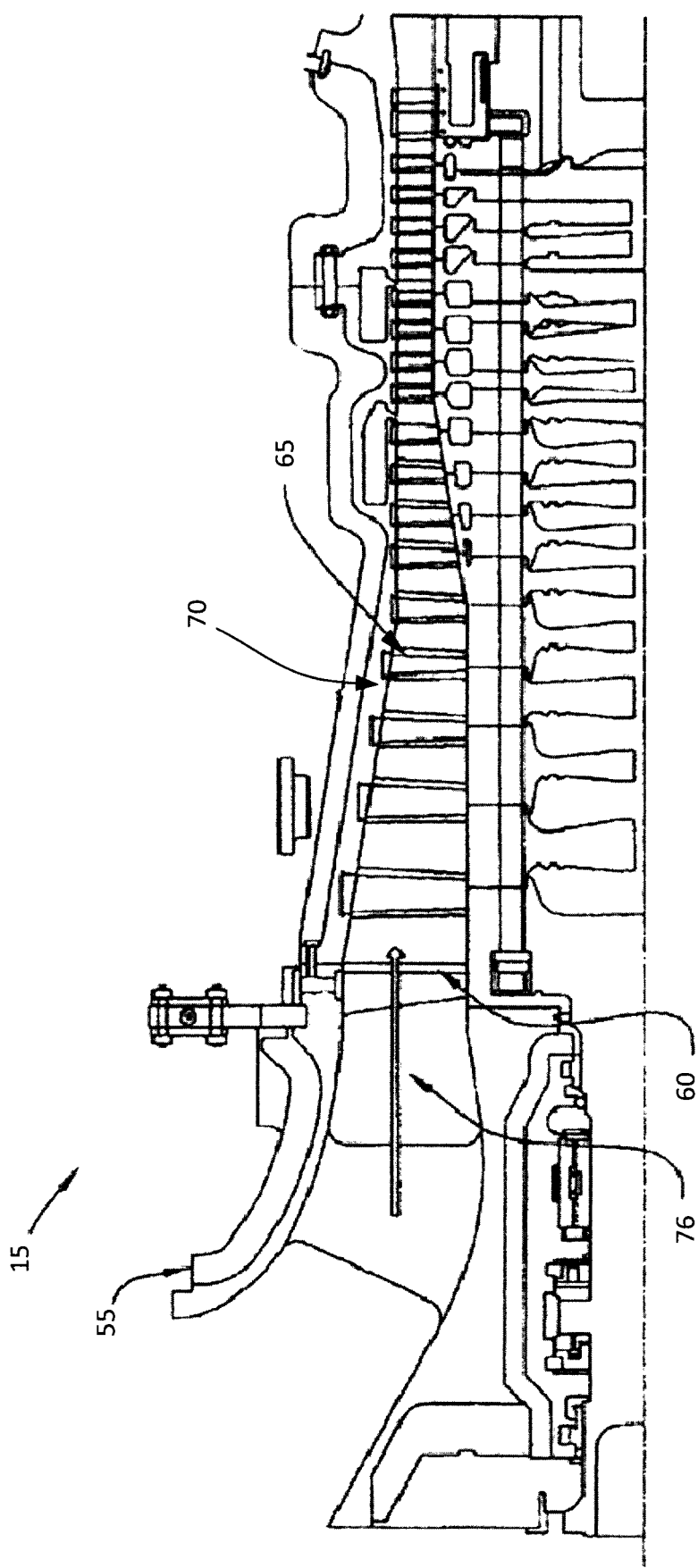
FIG. 2 is a schematic diagram of a compressor section as may be used with the gas turbine engine of FIG. 1.

FIG. 2 shows a schematic diagram of an example of the compressor 15 described above and the like. The compressor 15 may include a compressor bellmouth 55, a number of inlet guide vanes 60, a number of compressor stator vanes 65, and a number of compressor rotor blades 70. The compressor stator vanes 65 and rotor blades 70 may be organized in stages of any number. Known wash methods generally involve the placement of water wash nozzles (not shown) such that the wash water follows a generally axial path 75 through the compressor 15 while cleaning the components therein. The compressor 15 shown herein is for the purpose of example only. Many other compressor designs and components also may be used.

FIG. 3 shows the use of the gas turbine engine 10 with an anticorrosion treatment system 100 as may be described herein. As described above, the gas turbine engine 10 may include the compressor 15, the combustor 25, and the turbine 40 so as to drive the load 50 or otherwise. The compressor 15 may receive the flow of air 20 via an air inlet system 110. The air inlet system 110 may include an inlet filter house 120 and other types of air treatment components in communication with the inlet to the compressor 15.

The anticorrosion treatment system 100 may include a compressor wash system 130. The compressor wash system 130 may be substantially of conventional design. The compressor wash system 130 may include a washing fluid supply 140. The washing fluid may be deionized water and the like. The compressor wash system 130 may be in communication with the compressor 15 via a number of injection nozzles 150. Any number of the injection nozzles 150 may be used. The injection nozzles 150 may be positioned about the bellmouth 55 of the compressor 15 or elsewhere. The washing fluid supply 140 and the injection nozzles 150 may be in communication via a wash conduit 160 and a wash pump 170. Other components and other configurations may be used herein.

The anticorrosion treatment system 100 also may include a condensate or boiler feed water system 180. The condensate or boiler feed water system 180 may include a flow of condensate or boiler feed water from, for example, a combined cycle system (not shown). Other types of water sources may be used herein. The condensate or boiler feed water flow may include a concentration of an anticorrosion agent therein. In this example, the anticorrosion agent may be a flow of amine, polyamine, and the like. Other types of anticorrosion agents may be used herein. An amine concentration of about three to about thirty parts per million or so may be effective for anticorrosion treatment of the compressor components. Other concentrations may be used herein.

The condensate or boiler feed water may be routed directly to the condensate or boiler feed water system 180 and/or stored in a condensate or boiler feed water supply 190 about, for example, a water skid or elsewhere. The condensate or boiler feed water system 180 may be in communication with the compressor wash system 130 via a condensate or boiler feed water conduit 200. The wash conduit 160 of the compressor wash system 130 and the condensate or boiler feed water conduit 200 of the condensate or boiler feed water system 180 may meet at a T-joint 210 or at other suitable types of valves and/or piping to create a mixed flow of the washing fluid and the condensate or boiler feed water. The mixed flow may be delivered to the compressor 15 via the injection nozzles 150 and the like. Other components and other configurations also may be used herein.

The anticorrosion treatment system 100 also may include an anticorrosion dosing system 220. The anticorrosion dosing system 220 may include an amine supply 230 with a flow of amine therein. The concentrations of the amine may vary. Other types of anticorrosion agents may be used herein. The anticorrosion dosing system 220 may be in communication with the compressor wash system 130 via a dosing supply conduit 240 and a dosing pump 250. Further, a dosing valve 260 may be positioned on the dosing supply conduit 240. The anticorrosion dosing system 220 may vary the concentration of the anticorrosion agents in the condensate or feed water flow and/or the mixed flow. Other components and other configurations also may be used herein.

As is shown in FIG. 4, the anticorrosion treatment system 100 also may include a temperature and concentration management system 270. The temperature and concentration management system 270 may include a microprocessor 280. The microprocessor 280 may be of conventional design. The microprocessor 280 may include a microcontroller, a microcomputer, a programmable logic controller, an application specific integrated circuit, and/or other types of programmable circuits. The microprocessor 280 may be a standalone device or part of a larger system wide control system. The microprocessor 280 may receive a number of inputs 290 and may provide a number of outputs 300 via a number of communication links 310. The communication links 310 may be wired or wireless. Other components and other configurations may be used herein.

The temperature and concentration management system 270 may have any number of sensors in communication with the microprocessor 280. The sensors may include one or more chemical sensors 320 that may measure a chemical concentration and the like, one or more temperature sensors 330, one or more pressure sensors 340, and/or one or more flow rate sensors 350. Other types of sensors and other types of inputs may be used herein. The temperature and concentration management system 270 also may include a number of modulating valves 360 on the various conduits 160, 200, 240 in communication with the microprocessor 280. Likewise, one or more pressure valves 370 may be in communication with the microprocessor 280. Other types of valves and output control devices also may be used herein. A heat exchanger 380 also may be used with the pressure relief valve 370. The temperature and concentration management system 270 thus may determine and vary the characteristics of the condensate or boiler feed water flow and/or the mixed flow. Other components and other configurations may be used herein.

Figure 5:
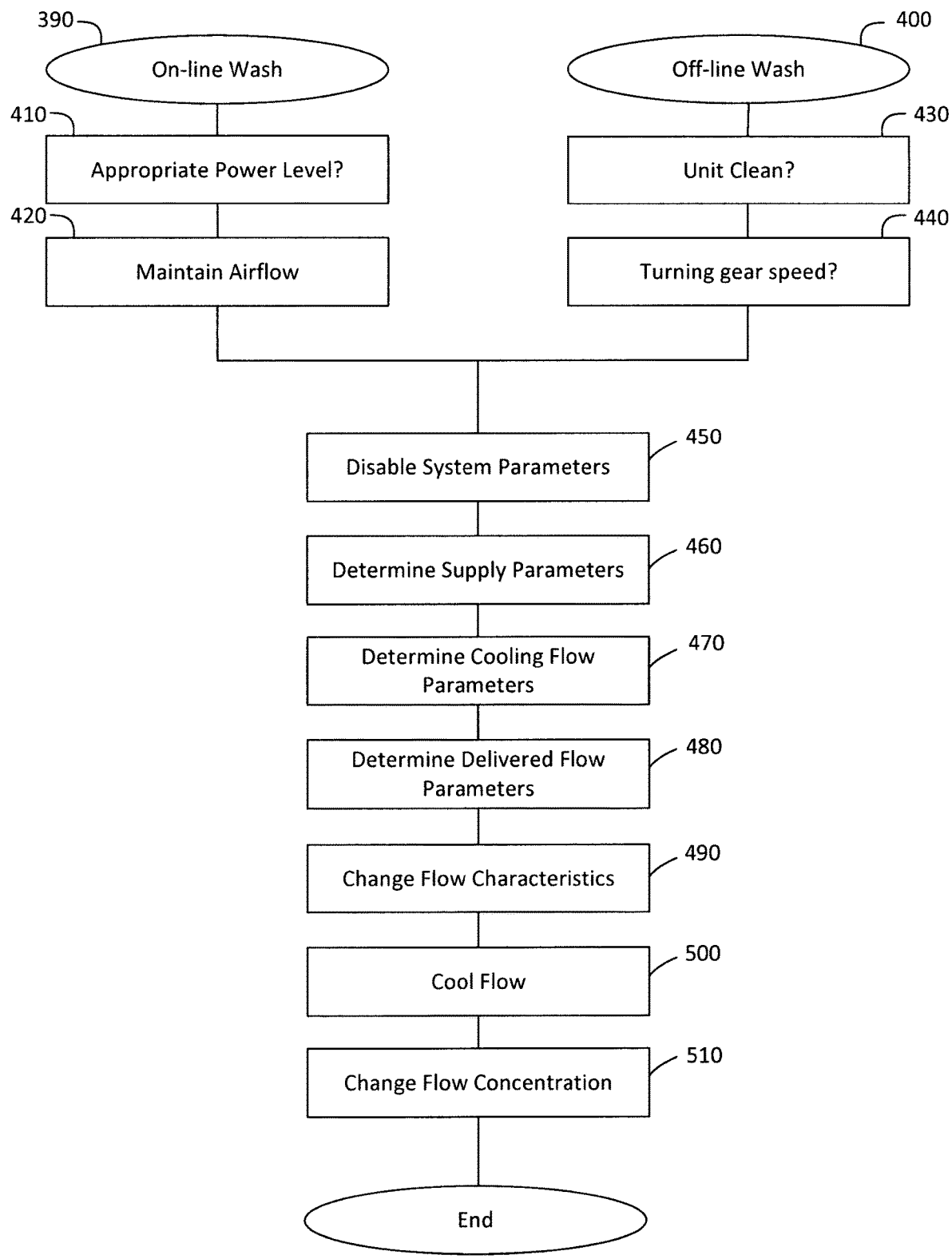
FIG. 5 is a flow chart showing exemplary steps of a method for compressor anticorrosion treatment as may be described herein.

FIG. 5 is a flowchart showing various method steps in implementing the anticorrosion treatment system 100. The anticorrosion treatment system 100 may be used for an online wash 390 or an offline wash 400. At step 410, an online wash 390 may commence if it is determined that the gas turbine engine 10 is at an appropriate power output level. At step 420, the gas turbine engine may be instructed to maintain a substantially constant airflow from the compressor 15 such that the combustor state does not lag changes in airflow. At step 430, an offline wash 390 may commence if it is determined that the unit is clean and has been washed within a predetermined parameter and, at step 440, that the system is at turning gear speed. In either case, certain system parameters may be disabled at step 450. The system parameters may include preventing in-process changes to the water supply, cycle time changes, sequence changes, use changes, and the like. Use changes may include unintended purposes such as power augmentation (the wash system may increase the mass flow rate so as to increase overall power). At step 460, certain supply parameters may be determined. Specifically, the temperature and concentration management system 270 may determine the pressure, the temperature, and the flow rate of the condensate or boiler feed water flow via the temperature sensors 330, the pressure sensors 340, and the flow rate sensors 350. Likewise, the concentration of amine in the condensate or boiler feed water flow may be determined by the chemical sensors 320. At step 470, the parameters of the wash flow may be determined. Specifically, the flow rate may be determined by one of the flow rate sensors 350. At step 480, the parameters of the mixed flow to the gas turbine engine 10 may be determined. The temperature of the mixed flow may be determined by the temperature sensors 330, the flow rate may be determined by one of the flow rate sensors 350, and the concentration of the amine in the flow may be determined by the chemical sensors 320. Other parameters may be monitored herein.

In response to the determined parameters, the temperature and concentration management system 270 may instruct the pressure valve 370 and/or the heat exchanger 380 to reduce the pressure and temperature of the condensate or boiler feed water flow at step 490. The pressure may be reduced by the pressure valve and the temperature may be reduced by the heat exchanger 380. For example, a typical flow of condensate or boiler feed water may have a pressure of about 40 bar (580 psig) and may be reduced to about 5.8 bar (85 psig) to 6.2 bar (90 psig). Likewise, the temperature may be reduced from about 250° Fahrenheit (121° Celsius) to about 185° Fahrenheit to about 150° Fahrenheit (85° Celsius to about 65.5° Celsius). Alternatively, the temperature of the condensate or boiler feed water flow may be reduced via a dilution at step 500. Specifically, the temperature and concentration management system 270 may provide a flow of the wash water via one of the modulating valves 360 so as to provide a mixed flow at the appropriate temperature range. For example, a target temperature may be about 60° Fahrenheit to about 70° Fahrenheit (about 16° Celsius to about 25° Celsius) for online water wash/treatment.

Depending upon the determined concentration of the amine in the flow, the concentration may be changed at step 510. Specifically, the temperature and concentration management system 270 may control the stroke of the dosing pump 250 to inject the correct amount of amine therein. Alternatively, the concentration may be diluted at step 520 by the addition of wash water via one of the modulating valves 360. Other steps may be performed herein in any order.

The temperature and concentration management system 270 may operate in an open loop/feed forward system or in a closed loop/feedback system so as to provide the appropriate temperature and concentration. The temperature and concentration management system 270 also may be in communication with a compressor corrosion monitor and the like.

The anticorrosion treatment system 100 thus uses the temperature control management system 270 so as to provide a flow of amine at the appropriate pressure, temperature, and concentration. The system 100 herein thus removes contaminants and deposits on the compressor components while developing/forming a passivation layer on all metallic surfaces therein. The anticorrosion treatment system 100 may be integrated into existing systems. Moreover, the anticorrosion treatment system 100 does not extend outages or impact overall system efficiency. Further, use of the system 100 should improve overall component lifetime. Specifically, the propensity for compressor blade erosion from the numerous water washes may be reduced as well as the overall rate of propagation.

Although the anticorrosion treatment system 100 has been described for use with the compressor 15, the systems and methods described herein also may applicable to the components of the turbine 40. Other types of turbine equipment and other types of rotating equipment also may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine, comprising:
   a compressor;
   a compressor wash system in communication with the compressor, the compressor wash system configured for online and offline washes using anticorrosion components to slow corrosion in the compressor;
   a condensate or boiler feed water system in communication with the compressor;
   a dosing system in communication with the condensate or boiler feed water system; and
   a temperature and concentration management system comprising:
   one or more sensors configured to determine a concentration of the anticorrosion components in a flow of condensate or boiler feed water in the condensate or boiler feed water system, a temperature of the flow of condensate or boiler feed water, and a pressure of the flow of condensate or boiler feed water in a feedback loop; and
   a controller configured to modify the temperature of the flow of condensate or boiler feed water and the pressure of the flow of condensate or boiler feed water, and to modify the concentration of the anticorrosion components by adjusting the flow of condensate or boiler feed water into the compressor via the condensate or boiler feed water system, and by adjusting a flow of the anticorrosion components via the dosing system;

wherein the temperature and concentration management system is configured to automatically control the temperature of the flow of condensate or boiler feed water, the pressure of the flow of condensate or boiler feed water, and the concentration of the anticorrosion components based on an output from the one or more sensors.

2. The gas turbine engine of claim 1, wherein the compressor wash system comprises a deionized wash fluid.

3. The gas turbine engine of claim 1, wherein the compressor wash system comprises a plurality of nozzles positioned about a bellmouth of the compressor.

4. The gas turbine engine of claim 1, wherein the condensate or boiler feed water system is in communication with the compressor wash system upstream of the compressor.

5. The gas turbine engine of claim 1, wherein the anticorrosion components comprise a flow of amine.

6. The gas turbine engine of claim 1, wherein the dosing system is in communication with the compressor wash system upstream of the compressor, and wherein the dosing system is configured to modify the concentration of the anticorrosion components in the flow of condensate or boiler feed water responsive to instruction from the temperature and concentration management system.

7. The gas turbine engine of claim 1, wherein the temperature and concentration management system is in communication with the compressor wash system, the condensate or boiler feed water system, and the dosing system.

8. The gas turbine engine of claim 7, wherein the temperature and concentration management system comprises a flow sensor and a modulating valve in communication with the compressor wash system.

9. The gas turbine engine of claim 7, wherein the one or more sensors includes a pressure sensor and wherein the temperature and concentration management system comprises a pressure valve in communication with the condensate or boiler feed water system.

10. The gas turbine engine of claim 7, wherein the temperature and concentration management system comprises one or more flow sensors and one or more modulating valves in communication with the condensate or boiler feed water system.

11. The gas turbine engine of claim 7, wherein the one or more sensors includes a temperature sensor and wherein the temperature and concentration management system comprises one or more heat exchangers in communication with the condensate or boiler feed water system.

12. The gas turbine engine of claim 7, wherein the one or more sensors includes one or more chemical sensors that are in communication with the condensate or boiler feed water system and the dosing system.

13. A method of providing an anticorrosion treatment to a compressor, comprising:

providing a flow of condensate or boiler feed water and one or more sensors;

determining one or more flow characteristics of the flow of condensate or boiler feed water;

determining a concentration of an amine-based anticorrosion component in the flow of condensate or boiler feed water using one or more sensors in a feedback loop;

determining a temperature of the flow of condensate or boiler feed water using the one or more sensors in the feedback loop;

determining a pressure of the flow of condensate or boiler feed water using the one or more sensors in the feedback loop;

automatically adjusting the one or more flow characteristics, the temperature of the flow of condensate or boiler feed water, the pressure of the flow of condensate or boiler feed water, and the concentration of the amine-based anticorrosion component to within one or more predetermined parameters based on an output from the one or more sensors; and flowing the flow of condensate or boiler feed water into the compressor.

14. An anticorrosion treatment system for use with a gas turbine engine, comprising:

a wash system for providing a flow of a wash fluid to the gas turbine engine, the wash system configured to slow corrosion using anticorrosion components;

a condensate or boiler feed water system for providing a flow of condensate or boiler feed water to the gas turbine engine; and a temperature and concentration management system comprising:

one or more sensors configured to determine a concentration of the anticorrosion components in the flow of the condensate or boiler feed water to the gas turbine engine, a temperature of the flow of condensate or boiler feed water, and a pressure of the flow of condensate or boiler feed water in a closed feedback loop; and a controller configured to modify the temperature of the flow of condensate or boiler feed water and the pressure of the flow of condensate or boiler feed water, and to modify the concentration of the anticorrosion components by adjusting the flow of condensate or boiler feed water into the gas turbine engine via the condensate or boiler feed water system, and by adjusting a flow of the anticorrosion components via a dosing system;

wherein the temperature and concentration management system is configured to automatically control the temperature of the flow of condensate or boiler feed water, the pressure of the flow of condensate or boiler feed water, and the concentration of the anticorrosion components based on an output from the one or more chemical sensors.

15. The anticorrosion treatment system of claim 14, further comprising the dosing system for varying the concentration of the anticorrosion components in the flow of condensate or boiler feed water to the gas turbine engine.

16. The anticorrosion treatment system of claim 14, wherein the anticorrosion components comprise a flow of amine.

17. The anticorrosion treatment system of claim 14, wherein the temperature and concentration management system comprises one or more pressure sensors, one or more temperature sensors, and/or one or more flow rate sensors.

18. The anticorrosion treatment system of claim 14, wherein the temperature and concentration management system is further configured to: control one or more pressure valves to reduce the pressure of the flow of condensate or boiler feed water; and control one or more heat exchangers to reduce the temperature of the flow of condensate or boiler feed water.

\* \* \* \* \*